Gates, Fraser & Chalmers,
Steam-Engine Valve-Gear.
N°24,624.    Patented July 5, 1859.
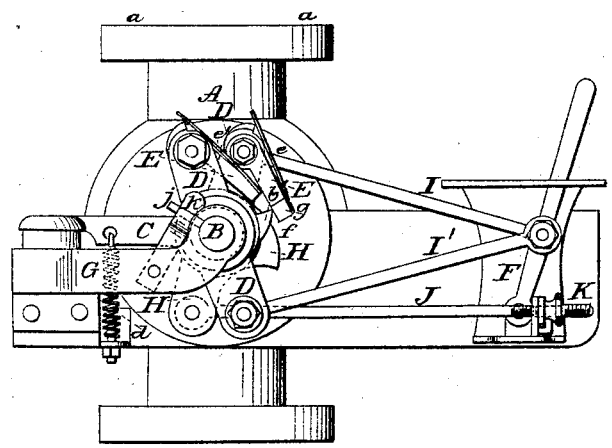
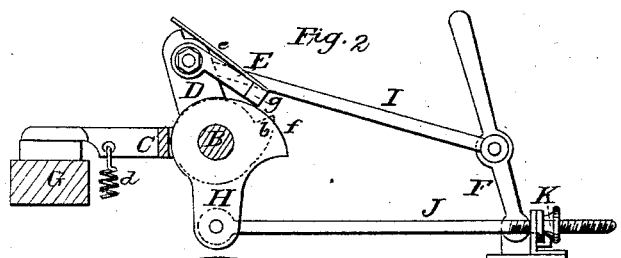
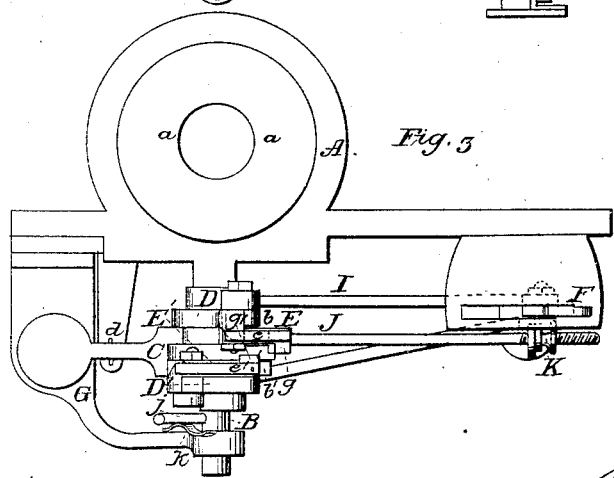
Witnesses:
Inventors:

UNITED STATES PATENT OFFICE.

P. W. GATES, D. R. FRASER, AND THOS. CHALMERS, OF CHICAGO, ILLINOIS.

CUT-OFF GEAR FOR STEAM-ENGINES.

Specification of Letters Patent No. 24,624, dated July 5, 1859.

*To all whom it may concern:*

Be it known that we, P. W. GATES, D. R. FRASER, and THOMAS CHALMERS, all of Chicago, in the county of Cook and State of Illinois, have invented a new and Improved Variable Cut-Off Gear for Steam-Engines; and we do hereby declare that the following is a full, clear, and exact description of the same, reference being had to the accompanying drawings, forming part of this specification, in which—

Figure 1 is a side view of a cut-off with our improvement. Fig. 2 is a vertical section of the same in a plane parallel with Fig. 1. Fig. 3 is a plan of the same.

Similar letters of reference indicate corresponding parts in the several figures.

Our invention consists in certain improved mechanism applicable in combination either with an oscillating or rolling cut-off valve which is independent of the induction valve or valves, or with two rolling or oscillating valves which are applied at opposite ends of the cylinder, and which constitute also the induction valves, whereby we are enabled to vary the point of cut-off, either under the control of the governor, for the purpose of governing the engine or by any suitable means of adjustment to cut off at such point as may be desired.

In the example of our invention represented in the drawing, it is applied in combination with an independent cut-off valve. We will first describe this mode of applying it, and then explain briefly its application in combination with two valves at opposite ends of the cylinder.

A is the valve box containing the oscillating or rolling cut-off valve, which may be of any known construction. This box may be set upright on the top of the steam chest, or in any other way applied to the engine, the steam pipe being connected at $a\ a$.

B is the valve stem working through a stuffing box in one side of the valve.

C is a forked lever rigidly secured to the valve stem, said lever having the two prongs of its fork terminating in two similar teeth $b$, $b'$, and having a spring $d$, or a weight, applied to it in such a manner as to exert a constant tendency to close the valve. The said lever is also so extended on the opposite side of the stem to the teeth $b$, $b'$, that it may come in contact with a stationary stop on a bracket G, which supports the outer end of the valve stem, to arrest the valve, when closed by the spring $d$; and this stop is cushioned with india-rubber, or other soft material to prevent the effects of violent concussion. D, D' are two other levers fitted loosely to the stem B, so as to be capable of oscillating loosely thereon. These levers are connected by means of rods I, I', with a rocker F, or its equivalent, which derives motion from an eccentric, or its equivalent, on the main shaft of the engine; or the said rods I, I', may connect the said levers directly with the eccentric. The connections of the said rods I, I', with the levers D, D', are on opposite sides of the valve stem so that the movements of the said levers will always be in opposite directions. The said levers D, D', carry two dogs E, E', for the purpose of engaging with the teeth $b$, $b'$, of the forked lever, E, with $b$, and E', with $b'$, and so producing the necessary movement of the lever to open the valve, the said dogs having springs $e$, $e'$, applied in such a manner as to tend to hold them in gear with the teeth $b$, $b'$.

H is a plate fitted to turn on the valve stem between the prongs of the forked lever C, and having a curved edge $f$, which is eccentric to the stem, and which constitutes a guide for two projections $g$, $g'$, that are provided on the dogs E, E', the said projections traveling along the said edge for the purpose of liberating the dogs from the teeth $b$, $b'$, for the purpose of permitting the closing of the valve by the spring $d$, to cut off the steam. The said plate H, is represented as being connected with a rod J, which is adjustable by means of a nut K, which is confined longitudinally to turn the said plate upon the shaft for the purpose of varying the point of cut off, but the said rod may be connected with a governor.

$j$ is a small arm secured to the valve stem to work against a curved spring $k$, which is secured to the bracket G, or other stationary part of the engine. The pressure of the steam against the inner end of the valve stem tends to force the cut-off valve away from its seat, though the valve may be otherwise balanced. This tendency is prevented while the valve is closed, by the pressure of the spring $k$, against the arm $j$, but as soon as the valve begins to turn in its seat in a direction to open, the arm $j$, following the curve of the spring $k$, permits it to move slightly away from the seat, and so relieve it of friction, and prevent its wear. As the valve moves in a direction to close it the passage of the arm $j$, along the face of the spring $k$, forces it back to its seat. The arm $j$, may be fitted with an anti-friction roller. An unyielding curved surface may be used instead of the spring $k$, but will form an imperfect substitute therefor.

The operation of the cut-off gear is as follows: The two levers D, D′, deriving an oscillating motion in opposite directions from the rods I, I′, cause their dogs E, E′, to act upon the teeth $b$, $b'$, of the lever C, alternately to open the valve, one dog and tooth operating to open the valve to admit steam for one stroke of the engine, and the other dog and tooth for the return stroke. As the dogs move along the eccentric curved edge $f$, of the plate H, they are gradually thrown out from the teeth $b$, $b'$, until they escape therefrom and permit the valve to be closed by the spring $d$, or its equivalent to cut off the steam. This escape takes place sooner or later in the stroke of the piston, according to the position of the plate H, as adjusted by the nut K, or its equivalent, or controlled by the governor.

In applying the invention in combination with two separate valves, as hereinafter mentioned, a separate lever C, will be required on the stem of each valve, one to carry the tooth $b$, and the other the tooth $b'$, and the lever D, will require to be on one valve stem, and the lever D′, on the other one, and each valve stem will require a separate plate H. The connections of the levers D, D′, with the eccentric, or its equivalent will require to be such that the valves will be opened alternately, and the operation will be in effect the same as when the single cut-off valve is employed.

The oscillating valve may be of the cylindrical, conical, or disk kind.

What we claim as our invention, and desire to secure by Letters Patent, is:—

1. The combination of the two levers D, D′, and their dogs E, E′, the lever or levers C, and its or their teeth $b$, $b'$, and the eccentric curved plate or plates H, the whole applied to the stem or stems of the valve or valves to operate substantially as herein set forth.

2. And we also claim in combination with the said levers, teeth and dogs, and the eccentric curved plate or plates, of the arm $j$, on the valve stem, and the spring or stationary curved surface $k$, applied and operating together substantially as and for the purpose herein specified.

P. W. GATES.
    D. R. FRASER.
    THOS. CHALMERS.

Witnesses:
 I. L. FARGO,
 HENRY WILLEY.